United States Patent [19]

Naples

[11] Patent Number: 5,234,027
[45] Date of Patent: Aug. 10, 1993

[54] FLUID FLOW INHIBITOR FOR USE IN A STATIC FLOW SYSTEM DEVICE

[75] Inventor: Frank J. Naples, Reading, Pa.
[73] Assignee: UGI Corporation, Reading, Pa.
[21] Appl. No.: 938,735
[22] Filed: Aug. 31, 1992
[51] Int. Cl.⁵ ............................................. F16K 17/24
[52] U.S. Cl. ................... 137/513.3; 73/707; 137/498; 137/519
[58] Field of Search ............ 137/513.3, 517, 519, 137/498; 73/707

[56] References Cited

U.S. PATENT DOCUMENTS

| | | | |
|---|---|---|---|
| 821,859 | 5/1906 | Clegg | 137/513.3 |
| 920,716 | 5/1909 | Beckman | 137/513.3 |
| 2,191,990 | 2/1940 | Jordan | 73/707 X |
| 2,389,887 | 11/1945 | Baxter | 137/517 |
| 2,623,725 | 12/1952 | Sands | 137/513.3 X |
| 2,729,235 | 1/1956 | Stevenson | 137/498 |
| 3,367,187 | 2/1968 | Smith | 137/498 X |
| 3,794,077 | 2/1974 | Fanshier | |
| 3,804,114 | 4/1974 | Morgan | |
| 3,841,520 | 10/1974 | Bryant | 137/517 X |
| 4,080,988 | 3/1978 | Robertson | |
| 4,310,017 | 1/1982 | Raines | |
| 4,392,507 | 7/1983 | Harris | |
| 4,393,751 | 7/1983 | Kelley | |
| 4,531,543 | 7/1985 | Markley | |
| 4,570,669 | 2/1986 | Pauliukonis | |
| 4,683,910 | 8/1987 | Benson et al. | |
| 5,105,850 | 4/1992 | Harris | |

FOREIGN PATENT DOCUMENTS 554522 7/1943 United Kingdom .................. 73/707

*Primary Examiner*—Robert G. Nilson
*Attorney, Agent, or Firm*—M. Lukacher; G. Leinberg

[57] ABSTRACT

A flow restricting device is described which includes a conduit with a flow inhibitor therein. A plug stem is placed inside a passage in the inhibitor such that it can slide axially, while the head of the plug, which has a larger cross-sectional area than the passage, remains outside the passage. When the fluid pressure upstream of the flow inhibitor is greater than the fluid pressure downstream thereof, the head of the plug is forced against the face of the inhibitor and flow is restricted. To facilitate resetting of the inhibitor, the head allows a small amount of flow to pass to the downstream side, thereby equalizing the pressure across the device.

4 Claims, 3 Drawing Sheets

FLUID FLOW INHIBITOR FOR USE IN A STATIC FLOW SYSTEM DEVICE

FIELD OF INVENTION

This invention relates generally to fluid flow control devices and more particularly to a device for automatically inhibiting fluid flow when a fitting is disconnected or a downstream leak develops.

BRIEF DESCRIPTION OF PRIOR ART

Flow inhibitors, for use in dynamic flow systems, in the form of check valves, are generally known in the art. For instance, U.S. Pat. No. 4,570,669 describes a springless valve in which a movable valving pin prevents backflow by sealing the valve when pressurized by fluid from the downstream side of the valve. The valve remains closed until flow resumes in the normal direction, whereupon the fluid pressure forces the valving pin away from the valve seat. Similarly, U.S. Pat. No. 4,531,543 describes a springless valve in which a metal disk floats between closed and open positions. When fluid flows in a normal direction, fluid pressure forces the disk into the open position. When flow is reversed, the fluid pressure forces the disk into the closed position, thus interdicting flow.

Although these valves work well in systems in which the objective is to stop reverse flow, they are ineffective in a system in which fluid flow is static, for instance in a device for measuring system pressure. That is, without changes in direction of flow, the above-described valving elements will not move to a closed position.

U.S. Pat. No. 4,683,910 describes a springless valve which is used to stop a sudden increases in pressure in the normal direction of flow. Sudden pressure surges push a plug into the valve seat, thereby closing the valve. When the pressure subsides to a normal operating level, the plug is unseated by gravity. In the event the valve is used in a static system subject to long-term pressure increases, the plug will not unseat automatically because the differential pressure across the valve will not immediately decrease. Controlled equalization of the pressure difference is not under control and valve closure times are undesirably indeterminate.

The problems and drawbacks of such valves, as discussed above may, in accordance with the invention, be substantially eliminated by a springless flow inhibiting device which can automatically stop substantially all flow in a static flow system which results when a downstream fitting is disconnected or a downstream leak develops and which can automatically reset when the downstream fitting is reconnected or the leak is fixed. In addition, the device can dampen pressure surges in a system to prevent damage to downstream components and erroneons indications on downstream monitoring systems, (which are other problems with valves heretofore proposed), while at the same time allowing for controlled, rapid equalization of pressure across the device in the event of a long term change of system pressure.

SUMMARY OF INVENTION

It is an object of the present invention to provide an improved fluid flow restricting (inhibitor) device suitable for use in a static flow system.

It is a further object of the invention to provide an improved flow inhibitor device which can stop substantially all fluid flow in the event of a downstream leak or removal of downstream components.

It is a further object of this invention to provide an improved flow inhibitor device which can prevent damage to downstream components and erroneous readings on monitoring equipment when pressure surges occur.

It is a further object of the present invention to provide an improved flow inhibitor device which can be reset automatically when a downstream leak is repaired or a pressure surge subsides.

Briefly described, a fluid flow inhibitor in accordance with the invention includes conduit means having an upstream end and a downstream end. A first passage connects the two ends. Springless are also provided for inhibiting flow through the conduit means. A portion of the flow inhibiting means is disposed within the first passage. The flow inhibiting means has an upstream end and a downstream end. The upstream end of the flow inhibiting means has a face. A second passage connects the ends of the flow inhibiting means. Differential pressure across the inhibitor automatically controls the flow through the conduit without the need for springs and provides useful equalization of pressure even in systems in which flow is static most of the time.

DETAILED DESCRIPTION

Figure 1:
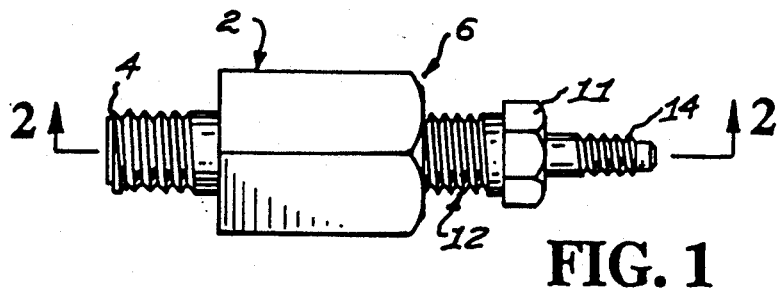
FIG. 1 is a side elevational view of the flow restricting device.
Figure 2:
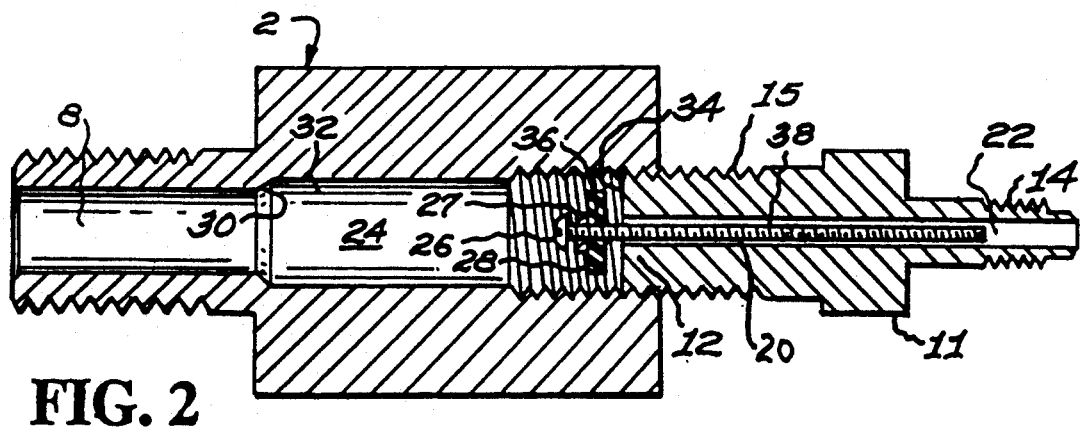
FIG. 2 is a sectional view taken along line 2—2 of FIG. 1.

Referring to FIG. 1, the flow inhibitor of the present invention is depicted. The flow inhibitor includes a conduit 2 having a male threaded upstream end 4 and a female threaded downstream end 6. The conduit preferably is an MPT to FPT adapter. A first passage 8 connects the upstream and downstream ends. A flow inhibiting assembly 10 acts as the flow inhibiting means. Assembly 10 includes a housing 11 having a male threaded upstream end 12 and a female threaded downstream end 14. Upstream end 12 is insertable into the downstream end 6 of the conduit means 2 (the MPT adapter). A passage 22 connects the upstream and downstream ends. In a preferred embodiment, housing 11 is a tubing to P-NPT adapter. The tubing is connected to the adapter by a coupling (46-FIGS. 3 and 4), attached to the end 14.

Figure 3:
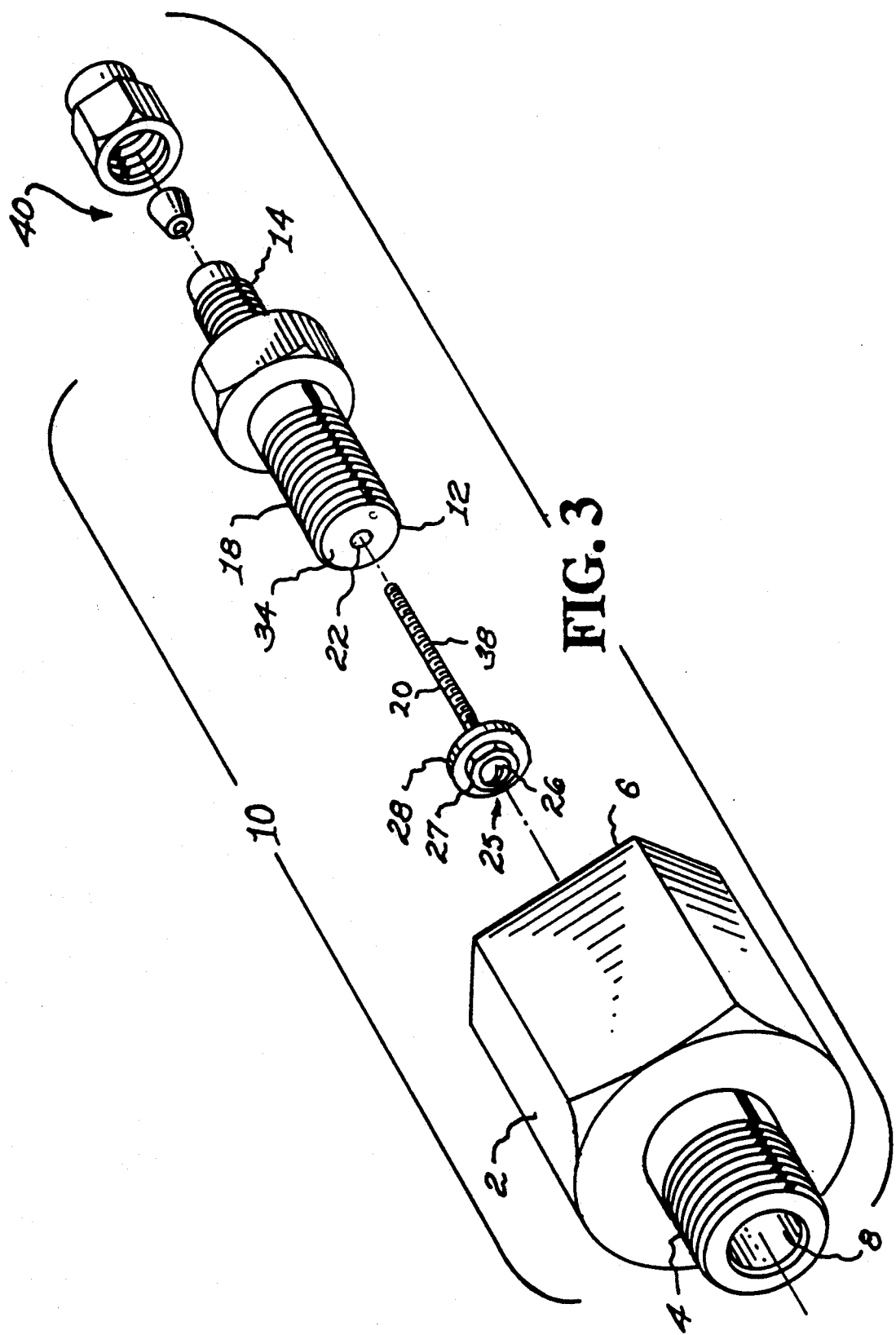
FIG. 3 is an exploded perspective of the flow restricting device.
Figure 4:
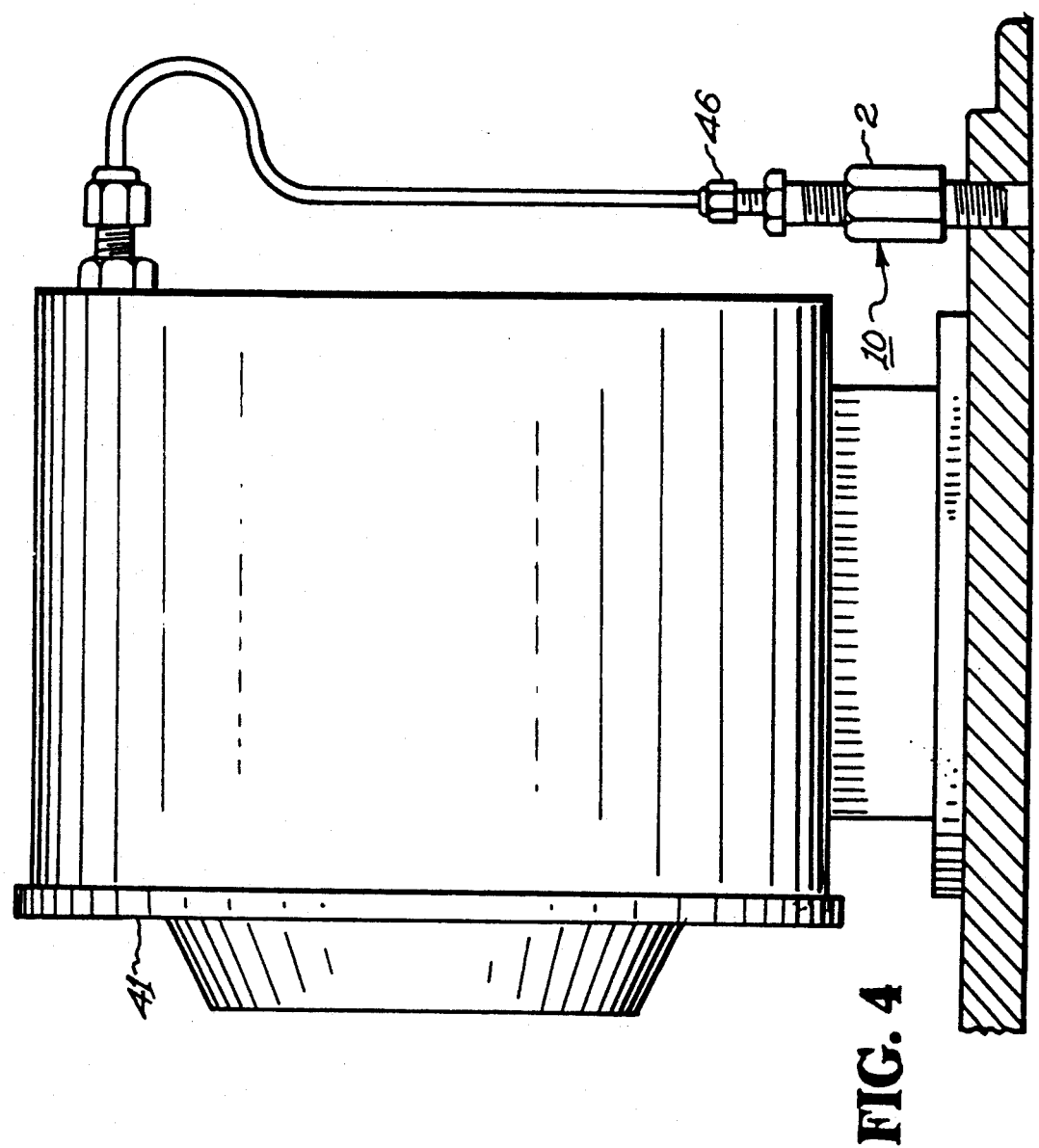
FIG. 4 is a schematic diagram of an installation including the flow restricting device.

Referring to FIG. 3, assembly 10 also includes a plug assembly 18. Plug assembly 18 includes stem 20, which is insertable into passage 22. The plug assembly 18 includes head 25 which provides a substantially fluid-tight seal when seated against the upstream end 12 of housing 11. Head 25 includes stem head 26, nut 27 and rubber washer 28. Plug assembly 18 preferably is assembled from a machine screw, which provides stem head 26 and stem 20, a hex nut, which provides nut 27, and an elastomeric material (e.g., rubber or Buna "N") pressure connection washer, which provides washer 28. Stem 20 has threads 38, and nut 27 is screwed thereon until it abuts stem head 26. Washer 28 seats against nut 27. The illustrated plug assembly 18 provides axial mobility and a substantially fluid tight seal, and is exemplary of other means which provides these functions.

When conduit means 2, plug assembly 18 and housing 11 are assembled into assembly 10, the upstream end 12 of housing 11 is inserted and screwed into the downstream end 6 of conduit means 2. Then a chamber 32 is formed between the face 34 of upstream end 12 and an inner wall 30 of conduit means 2. When the plug assembly 18 is fully inserted into the downstream end of conduit means 2, washer 28 does not seat against wall 30 of chamber 32. Rather, plug assembly 18 is free to travel axially in the assembly 10 within the chamber 32 between face 34 and wall 30.

After initial installation of the flow inhibitor of the present invention, flow (of gas in a typical application in a static-no gas flow-environment) entering upstream end 4 of conduit 2 travels through first passage 8, and plug assembly 18 travels in a downstream direction, seating washer 28 against face 34. Fluid flow is thereafter restricted by the seating of rubber washer 28 against face 34. Means for allowing a small amount of flow through head 24 when seated against face 34 is provided by an orifice 36, formed by the valleys between the threads 38 of the screw providing the stem 20, through washer 28. Thus, a restricted flow takes place along the threads 38 of stem 20, through nut 27 and rubber washer 28 and into the second flow path (the passage 22). When the volume downstream of downstream end 14 is sealed, pressure is gradually equalized across the flow inhibitor (across the plug assembly 18), and a pressure measurement of the system pressure can be obtained by monitoring equipment 41 connected downstream of housing 11. When the volume downstream is unsealed, fluid is allowed to escape at only a very slow rate.

In one use of the present invention, (see FIG. 4) the downstream equipment 41 includes a pressure gage. The flow inhibitor (assembly 10) is especially useful in this application, for instance, when the equipment 41 is removed for maintenance. With the flow inhibitor of the present invention, the expense of installing an isolation valve and the inconvenience of having to isolate each gage before removal can be eliminated.

From the foregoing description, it will be apparent that there has been provided an improved flow inhibitor apparatus. Variations and modifications in the herein described apparatus, within the scope of the invention, will undoubtedly suggest themselves to those skilled in the art. Accordingly, the foregoing description should be taken as illustrative and not in a limiting sense.

I claim:

1. A flow inhibitor, comprising: conduit means having an upstream end and a downstream end;
   a first passage connecting said ends;
   springless means for inhibiting flow through said conduit means, a portion of said flow inhibiting means being disposed within said first passage, said flow inhibiting means comprising an upstream end and a downstream end, said upstream end of said flow inhibiting means having a face; and
   a second passage connecting said ends of said flow inhibiting means,
   a plug, said plug having a stem and a head, said head having a larger cross-sectional area than said second passage;
   said stem being disposed within said second passage to align said head on said face to cover said second passage, whereby flow through said second passage is interdicted when said head is seated in said face;
   said head being disposed upstream of said stem such that a positive differential pressure upstream will cause said plug to move axially in a downstream direction in response to said positive differential pressure and will cause said head to seat against said face; and
   means for allowing flow through said head while said head is seated against said face.

2. The flow inhibitor according to claim 1, wherein said plug comprises:
   a screw having a screw head and a threaded stem;
   a nut on said stem proximate said head;
   washer on said stem proximate said nut, said nut being disposed between said washer and said head.

3. The flow inhibitor according to claim 2, wherein said means for allowing flow through said head is a path along said threads on said stem, said path having an inner wall defined by said threads and an outer wall defined by an inner surface of each of said nut and said washer.

4. The flow inhibitor according to claim 2, wherein said washer is made of elastomeric material.

* * * * *